US 6,616,210 B1

(12) United States Patent
Massey

(10) Patent No.: US 6,616,210 B1
(45) Date of Patent: Sep. 9, 2003

(54) PICKUP TRUCK BED COVER

(76) Inventor: Jerry R. Massey, P.O. Box 1378, Lanark Village, FL (US) 32323

(*) Notice: Subject to any disclaimer, the term of this patent is extended or adjusted under 35 U.S.C. 154(b) by 0 days.

(21) Appl. No.: 10/157,646

(22) Filed: May 29, 2002

(51) Int. Cl.[7] .................................................. B60P 7/02
(52) U.S. Cl. ........................... 296/100.1; 296/100.06; 296/37.6
(58) Field of Search ..................... 296/100.1, 100.02, 296/100.06, 100.07, 24.1, 37.1, 37.5, 37.6

(56) References Cited

U.S. PATENT DOCUMENTS

| | | | |
|---|---|---|---|
| 3,923,334 A | 12/1975 | Key | |
| 4,083,596 A | 4/1978 | Robertson | |
| 4,142,760 A | 3/1979 | Dockery et al. | |
| 4,261,611 A * | 4/1981 | Barry et al. | 296/100 |
| 4,533,171 A | 8/1985 | Lake | |
| 4,768,824 A | 9/1988 | Andonian | |
| 4,856,841 A | 8/1989 | Zadeh | |
| 5,094,499 A | 3/1992 | Simone | |
| 5,104,175 A | 4/1992 | Enninga | |
| D329,998 S * | 10/1992 | Sutton et al. | D12/156 |
| 5,207,470 A | 5/1993 | Zadeh | |
| 5,275,459 A | 1/1994 | Haddad, Jr. | |
| 5,322,336 A | 6/1994 | Isler | |
| 5,366,266 A | 11/1994 | Harbison | |
| 5,503,450 A | 4/1996 | Miller | |
| 5,564,773 A * | 10/1996 | Lapsley et al. | 296/100 |
| 5,868,453 A * | 2/1999 | Steigner | 296/100 |
| 5,909,921 A | 6/1999 | Nesbeth | |
| 5,951,095 A | 9/1999 | Herdon | |
| 5,961,173 A * | 10/1999 | Repetti | 296/37.6 |
| 6,042,173 A * | 3/2000 | Nett | 296/100.06 |
| 6,152,516 A | 11/2000 | Williams | |
| 6,186,576 B1 * | 2/2001 | Kepley et al. | 296/100.06 |
| 6,203,086 B1 * | 3/2001 | Dirks et al. | 296/37.6 |
| 6,217,102 B1 * | 4/2001 | Lathers | 296/100.07 |
| 6,234,559 B1 * | 5/2001 | Block et al. | 296/100.06 |
| 6,244,651 B1 | 6/2001 | Hecock | |
| 6,293,608 B1 | 9/2001 | Dicke et al. | |
| 6,340,195 B1 * | 1/2002 | Hall et al. | 296/100.07 |
| 6,439,639 B1 * | 8/2002 | Branting | 296/37.6 |
| 6,467,830 B1 * | 10/2002 | Cortright | 296/37.6 |

* cited by examiner

Primary Examiner—D. Glenn Dayoan
Assistant Examiner—H. Gutman
(74) Attorney, Agent, or Firm—J. Wiley Horton

(57) ABSTRACT

A truck bed cover is adapted to be attached to a toolbox. The cover is hinged to the rearward portion of the toolbox, thereby leaving the toolbox accessible even when the cover is closed over the bed. A single hydraulic cylinder may be used to raise and lower the cover. The hydraulic cylinder is anchored using cross pins in elongated slots. The anchor points are allowed to move so that upon closing the cover the cylinder shifts into a position which does not consume much of the useful space within the bed. A recessed channel on the underside of the cover locks over the pickup bed sides and the tailgate. When closed, the hydraulic cylinder pulls the cover tightly against the pickup truck body—thereby securing the contents of the bed. In addition, certain elements of the invention can be adapted for use in a cover which is not attached to a toolbox.

6 Claims, 12 Drawing Sheets

PICKUP TRUCK BED COVER

CROSS-REFERENCES TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE INVENTION

1. Field of the Invention

This invention relates to truck beds and covers. More specifically, the preferred embodiment of the invention comprises a truck bed cover which attaches to a toolbox so that the contents of the toolbox can be accessed without having to open the cover.

2. Description of the Related Art

Pickup trucks have been in widespread use for many decades. The advantages of the open pickup bed are well known. However, it is also desirable to cover the bed in order to protect items placed therein. Such a cover must protect the items being hauled while still providing ready access to the bed. U.S. Pat. No. 3,923,334 to Key (1975) discloses a hinged bed cover. It includes a pair of sliding links—appearing to be air cylinders—to control the motion of the cover. A latching mechanism is also provided to secure the cover in its down position.

U.S. Pat. No. 4,083,596 to Robertson (1978) shows a hinged bed cover with a supporting link to maintain it in a raised position. A hinged cover having the point of rotation along the side of the truck bed is shown in U.S. Pat. No. 4,142,760 to Dockery et.al. (1979). Like the Robertson device, it uses a swinging link to hold the cover in an elevated position. However, the Key, Robertson, and Dockery et.al. devices all require the user to lift and close the cover. This fact can be a substantial disadvantage, especially since the cover may be quite heavy.

An automated bed cover is disclosed in U.S. Pat. No. 5,094,499 to Simone, Jr. (1992). The '499 device employs a cable winch to raise and lower a pair of lift arms. These lift arms, in turn, raise and lower the bed cover. Automated bed covers are also disclosed in U.S. Pat. No. 5,503,450 to Miller (1996) and U.S. Pat. No. 5,909,921 to Nesbeth (1999).

While these devices do automate the process of raising and lowering the cover, they incorporate several undesirable features. Simone uses a centrally mounted winch platform. This platform, in combination with the two lift arms, consumes much of the useful space within the pickup truck bed. Nesbeth and Miller disclose the use of two cylinders—one on each side of the bed. This approach adds cost, along with the complexity of simultaneously controlling two cylinders.

In addition, most of the prior art covers are adapted to cover the entire pickup truck bed. In recent years, large mounted toolboxes have come into common use. FIG. 1 shows one such device. The reader will observe that toolbox 12 is bolted in place just behind the cab. It consumes a significant amount of bed space and prevents the use of a conventional bed cover.

Thus, the prior art devices are limited in that they:

1. Require the user to manually open and shut the cover;
2. Consume much of the useful space within the pickup truck bed;
3. Require the simultaneous operation of two lift cylinders; and
4. Cannot be used in conjunction with a large mounted toolbox.

BRIEF SUMMARY OF THE INVENTION

The present invention is a truck bed cover adapted to be attached to a toolbox. The cover is hinged to the rearward portion of the toolbox, thereby leaving the toolbox accessible even when the cover is closed over the bed. A single hydraulic cylinder may be used to raise and lower the cover. The hydraulic cylinder is anchored using cross pins in elongated slots. The anchor points are allowed to move so that upon closing the cover the cylinder shifts into a position which does not consume much of the useful space within the bed.

A recessed channel on the underside of the cover locks over the pickup bed sides and the tailgate. When closed, the hydraulic cylinder pulls the cover tightly against the pickup truck body—thereby securing the contents of the bed.

In addition, certain elements of the invention can be adapted for use in a cover which is not attached to a toolbox.

Figure 1:
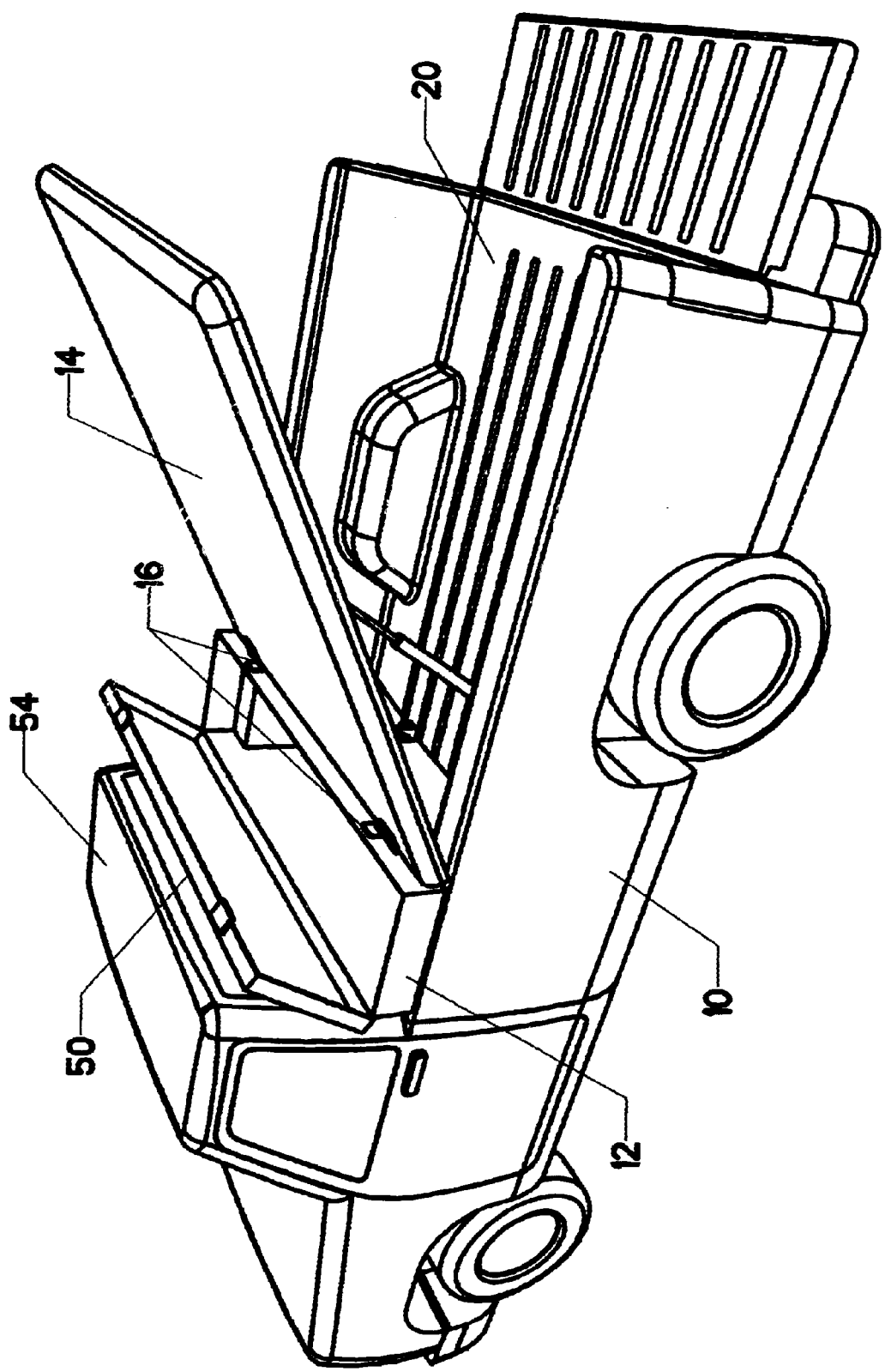
FIG. 1 is a perspective view, showing the proposed invention mounted on a pickup truck.

| REFERENCE NUMERALS IN THE DRAWINGS | | | |
|---|---|---|---|
| 10 | pickup truck | 12 | toolbox |
| 14 | cover | 16 | hinge |
| 18 | hydraulic cylinder | 20 | bed |
| 22 | tailgate | 24 | truck side |
| 26 | recessed channel | 28 | side wall |

-continued

REFERENCE NUMERALS IN THE DRAWINGS

| 30 | rod | 32 | cover bracket |
|---|---|---|---|
| 34 | rod pin | 36 | spring anchor |
| 38 | spring | 40 | rod slot |
| 42 | air cylinder | 44 | cylinder pin |
| 46 | cylinder slot | 48 | cylinder mount |
| 50 | toolbox lid | 52 | gutter |
| 54 | cab | 56 | toolbox bracket |
| 58 | side wall | | |

DESCRIPTION OF THE INVENTION

FIG. 1 shows a typical pickup truck 10 having a toolbox 12 installed in the forward portion of the bed 20, near cab 54. Toolbox 12 is covered by toolbox lid 50. Items which the truck's owner commonly needs are stored within toolbox 12. Thus, it is important for these items to remain accessible.

Bed 20 is used for the storage of larger items. Many prior art bed covers have been employed for pickup trucks. However, as those skilled in the art will know, these covers extend over the full length of bed 20. They are thus incompatible with the installation of a toolbox such as the one shown. The present invention eliminates this disadvantage by combining toolbox 12 and cover 14 into one integrated unit. As illustrated, cover 14 is linked to toolbox 12 by hinges 16. Cover 14 is just long enough to cover the portion of bed 20 lying behind toolbox 12.

Figure 2:
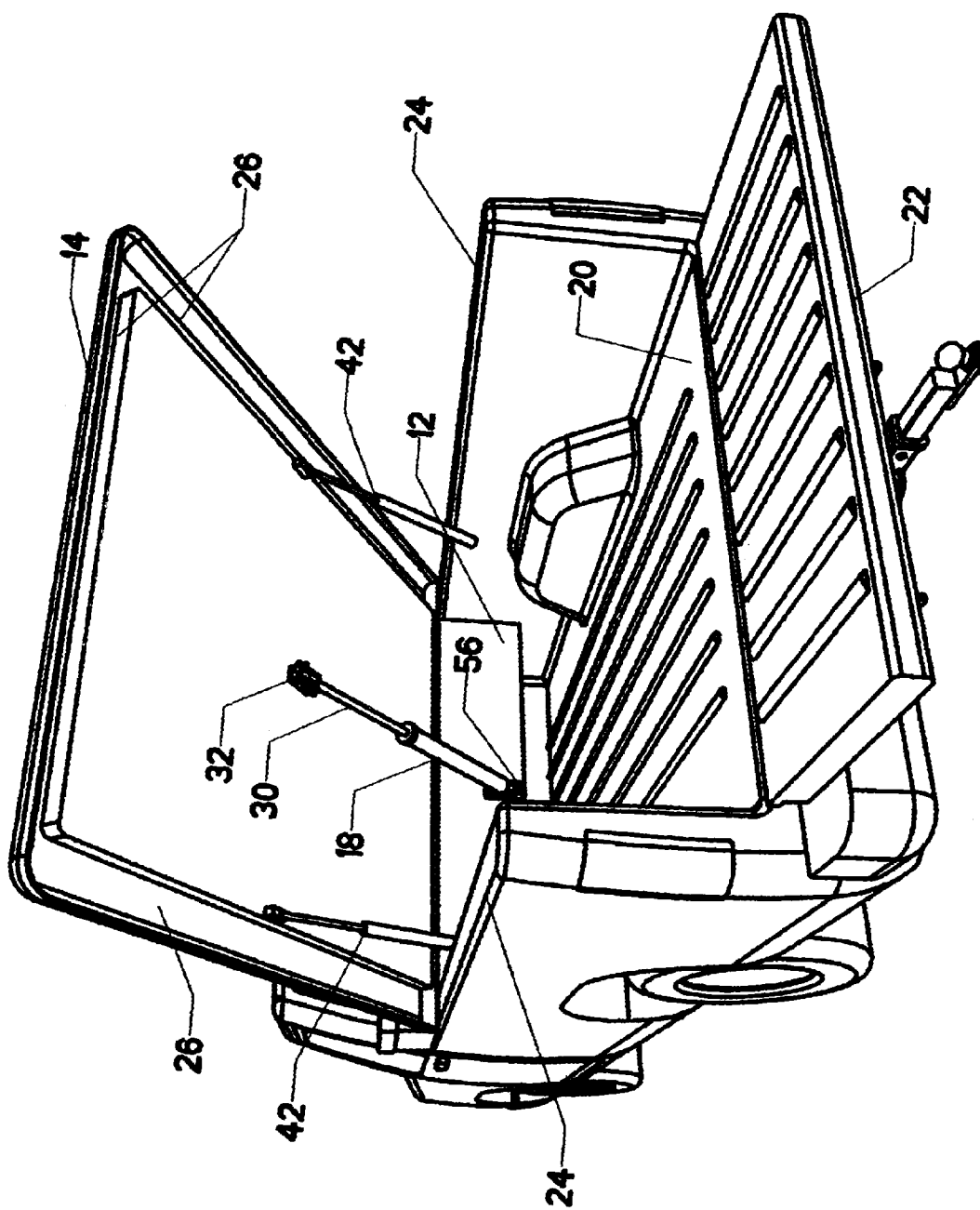
FIG. 2 is a perspective view, showing the position of the hydraulic cylinder.

FIG. 2 is a perspective view looking into bed 20 from the rear of the truck. Bed 20 is bounded by a left truck side 24, toolbox 12, and a right truck side 24. Tailgate 22—shown in the open position—selectively closes the rear of bed 20. Cover 14 is shown in the open position. The lower surface of cover 14 opens into recessed channel 26. When cover 14 is closed, recessed channel 26 fits snugly over the two truck sides 24 and tailgate 22.

Figure 3:
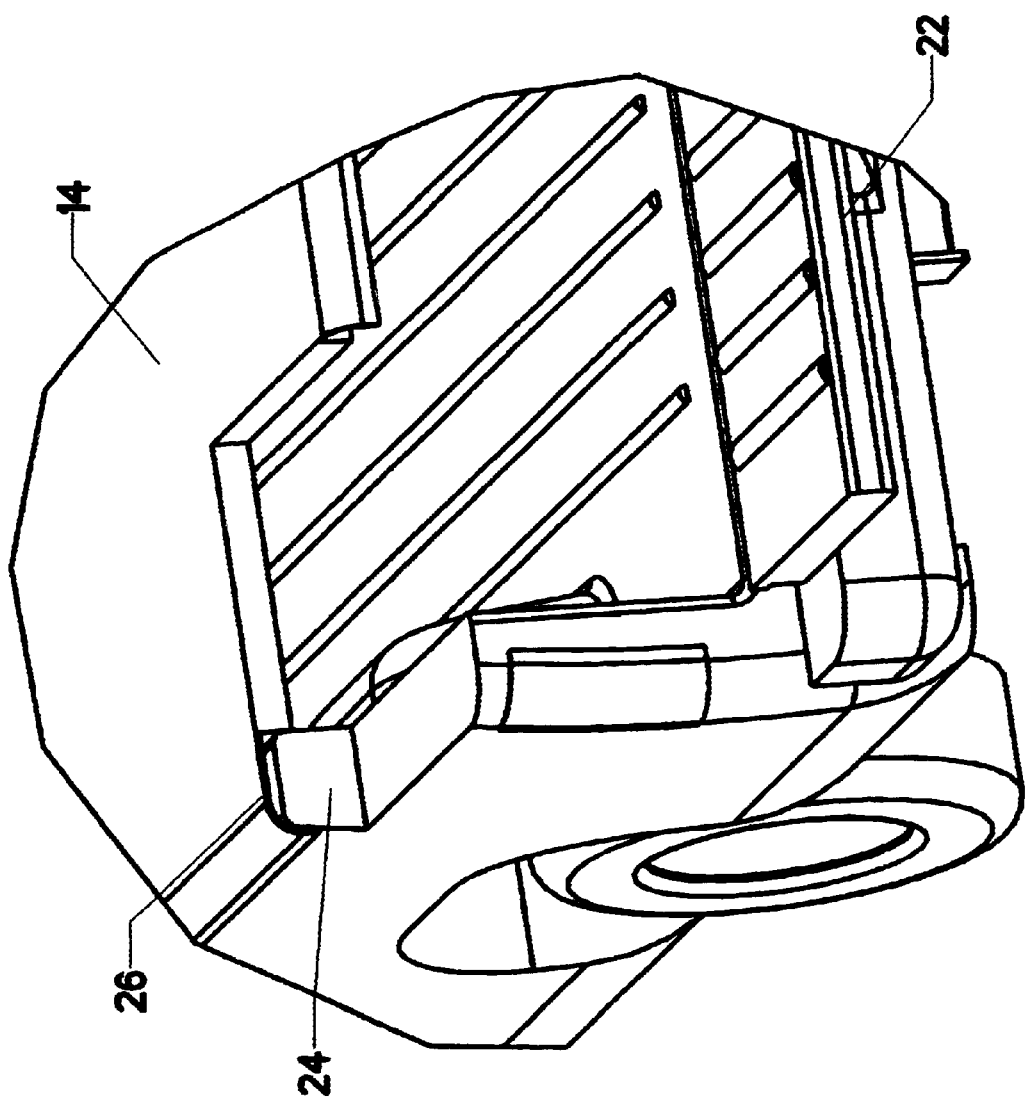
FIG. 3 is an isometric view, showing how the cover mates to the truck side.
Figure 4:
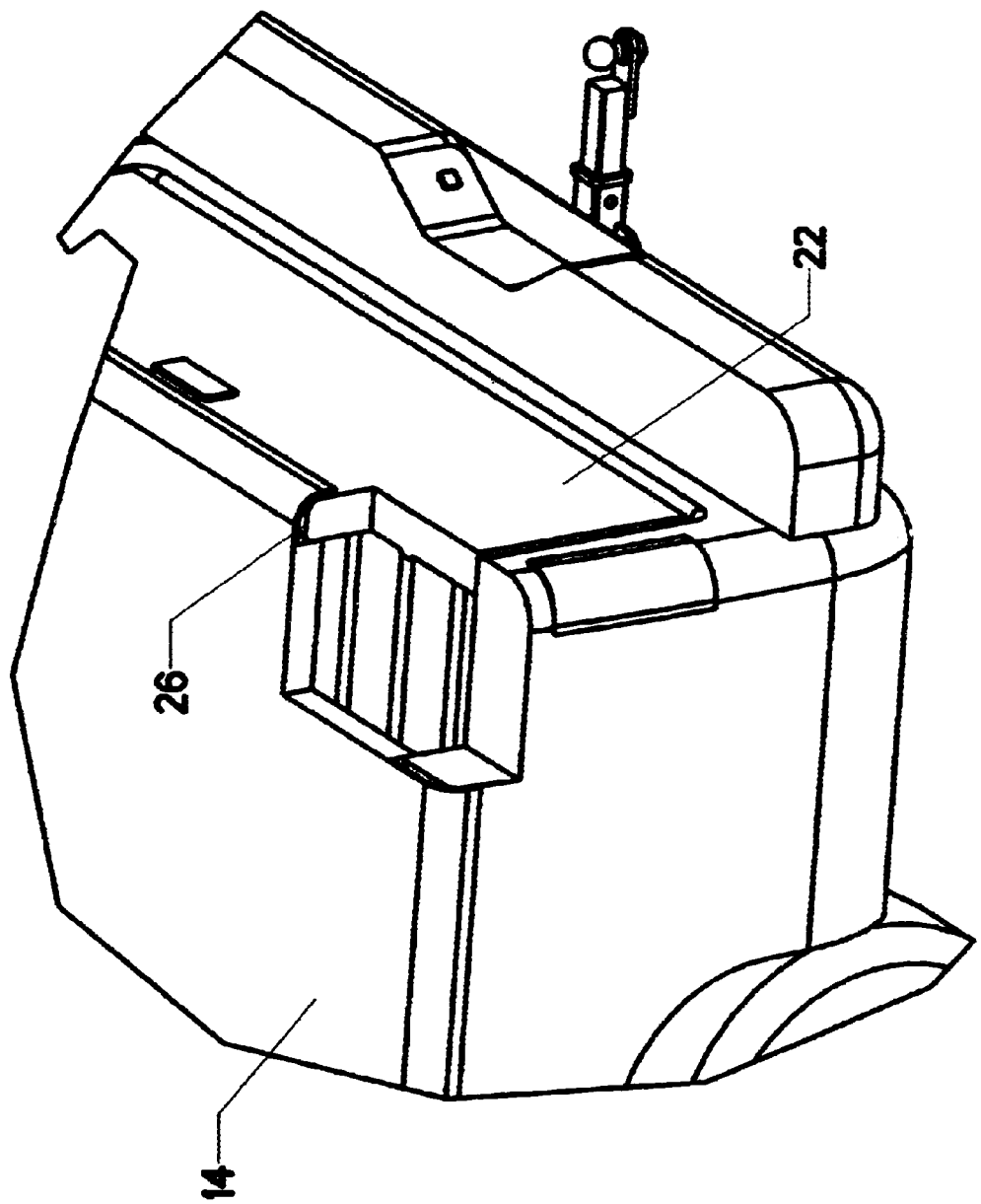
FIG. 4 is an isometric view, showing how the cover mates to the truck tailgate.

FIGS. 3 and 4 show the design of recessed channel 26 in greater detail. FIG. 3 shows a sectional view of cover 14 closed over truck side 24. The reader will observe that recessed channel 26 is shaped to fit snugly over the upper portion of truck side 24. FIG. 4 shows a sectional view of cover 14 closed over tailgate 22 (with tailgate 22 in the closed position). The portion of recessed channel 26 lying over tailgate 22 is shaped differently. Again, however, it fits snugly over the upper portion so as to engage tailgate 22.

Returning now to FIG. 2, those skilled in the art will appreciate that cover 14—depending on the materials selected for its construction—can be quite heavy. It may therefore be difficult for some users to lift into the open position. Accordingly, a pair of air cylinders 42 can be provided to assist in raising the cover. These types of cylinders are quite common in the prior art. They compress as cover 14 is closed, thereby acting as a sort of counterbalance to the weight.

It is also desirable to automate the opening and closing of cover 14. An extendable lift cylinder can be provided to accomplish this goal. FIG. 2 shows hydraulic cylinder 18 attached between toolbox 12 and cover 14. When rod 30 extends from hydraulic cylinder 18, it will push cover 14 to the open position—as shown. When it retracts, it will pull cover 14 closed. Hydraulic cylinder 18 can also be used to establish considerable closing force on cover 14 after cover 14 has seated over the two truck sides 24 and tailgate 22. It therefore secures the contents of bed 20 without the need for a lock.

Those skilled in the art will realize that hydraulic cylinders such as the one shown in FIG. 2 can exert considerable force—up to several thousand pounds. Particular attention must therefore be paid to how hydraulic cylinder 18 is anchored to toolbox 12 and cover 14. Cover 14 is preferably made of fiberglass, which can crack if too much stress is placed on it. Thus, if rod 30 is retracted too far into hydraulic cylinder 18, it could actually damage cover 14 or rip loose the mountings.

Figure 5:
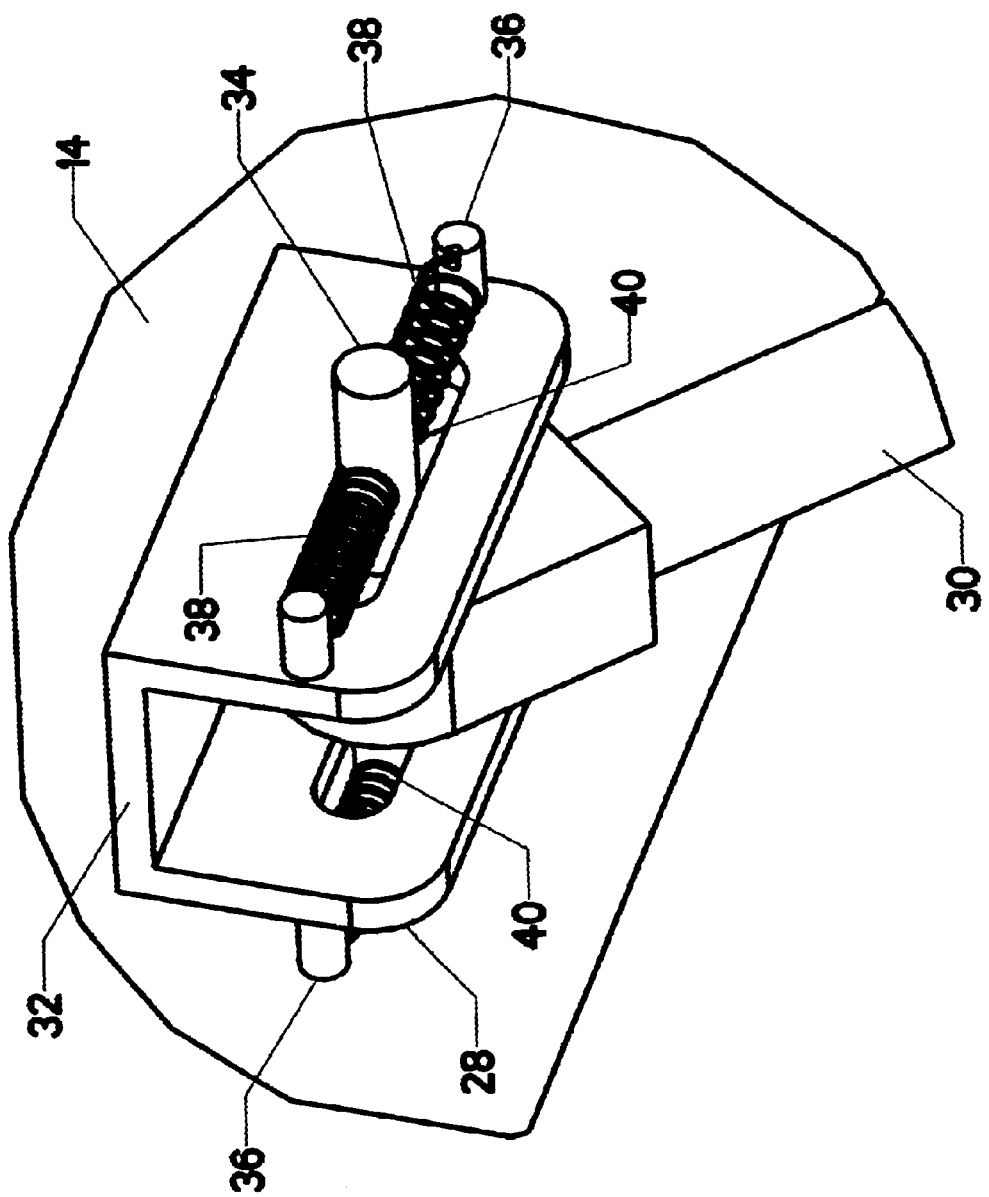
FIG. 5 is an isometric view, showing the details of how the hydraulic cylinder attaches to the cover.

Electrical limit switches are typically used to control the extension and retraction of rod 30. However, these have limited accuracy. It is therefore preferable to mount hydraulic cylinder 18 in such a manner that some inconsistency in the fully extended and fully retracted positions for rod 30 can be accommodated. FIG. 5 shows the provision for mounting rod 30 to the underside of cover 14. Cover bracket 32 is attached to the underside of cover 14 by conventional means—such as adhesives, rivets, or bolts. It has two descending side walls 28. Both of these open into rod slot 40, which passes transversely through both side walls 28.

The upper end of rod 30 is joined to a transverse rod pin 34. Rod pin 34 rests within the two rod slots 40. The reader will therefore appreciate that the extension and retraction of rod 30 will cause rod pin 34 to move within rod slot 40. Sets of springs 38 are provided to impede this movement. On the side visible in FIG. 5, two springs 38 are attached to spring anchors 36 and the exposed end of rod 34. The identical arrangement is found on the opposite side of cover bracket 32. These sets of springs are configured to bias rod pin 34 toward the middle of rod slot 40. However, they do allow some relative motion between rod 30 and cover 14, in order to allow for variations in the fully extended and filly retracted positions of rod 30.

Hydraulic cylinder 18 is preferably powered by a DC hydraulic pump using a small integral reservoir. Such a pump, which is quite common in the prior art, can be mounted within toolbox 12. The controls for actuating the pump can likewise be mounted within toolbox 12. This fact is important, since toolbox lid 50 can be locked in the closed position. This feature prevents unauthorized persons from accessing the hydraulic controls, thereby allowing them to open cover 14 and gain access to the bed. Obviously, the controls could also be mounted in the cab of the truck, although this would typically be a more difficult installation.

The aforementioned allowance for variations in the shut-off point for the closed position on hydraulic cylinder 18 is particularly important when cover 14 is brought to the closed position. Returning to FIG. 2, the reader will observe that cover 14—along with the associated recessed channel 26—is configured to close tightly over and secure the pickup truck bed (typically with tailgate 22 in the closed position). In order to secure the contents of the bed without the need for an additional locking mechanism, the control mechanism for hydraulic cylinder 18 must be set to exert considerable downward force on cover 14 before the hydraulic pump is switched off (with the associated hydraulic valves closing, thereby locking hydraulic cylinder 18 in position). Those skilled in the art will understand—by inspecting the geometry of the device—that if the electrical limit switch used to halt the retraction of rod 30 is slow to actuate, considerable extra force could be placed on cover 14, possibly damaging it. The use of springs 38 prevents this possibility.

Those skilled in the art will also realize that numerous spring configurations could be substituted for the one shown in FIG. 5. Other energy storage devices—such as air cylinders, elastic polymers, or leaf springs, could be substituted. The reader should also appreciate that many devices could be substituted for hydraulic cylinder 18. As one example, a screw drive device—often found in gate openers and aircraft control surface actuators—could be substituted. Any device which provides extension and retraction would work.

Returning again to FIG. 2, the reader should be aware that air cylinders 42 can be used in conjunction with hydraulic cylinder 18 in order to dampen any oscillating motions when cover 14 is opened or closed. However, they are not required for the operation of the invention. Likewise, the use of the hydraulic cylinder is entirely optional to the present invention.

Figure 6:
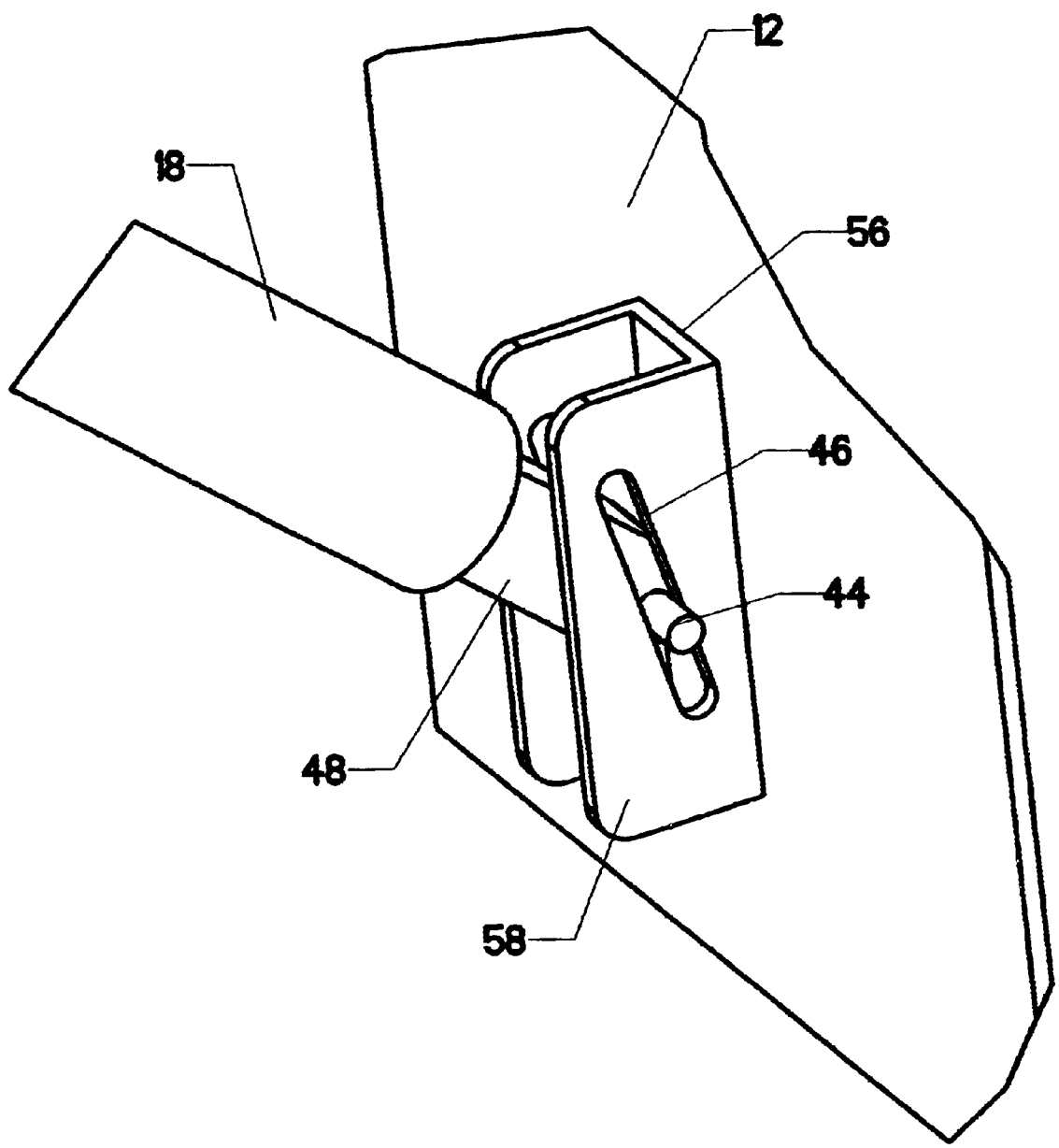
FIG. 6 is an isometric view, showing the details of how the hydraulic cylinder attaches to the toolbox.

The method of anchoring the lower part of hydraulic cylinder 18 to toolbox 12 incorporates another novel feature. FIG. 6 shows toolbox bracket 56, which is typically attached to a rearward facing portion of toolbox 12. Toolbox bracket 56 includes two rearward extending side walls 58. These two side walls open into a transverse cylinder slot 46. The reader will observe that cylinder slot 46 is angled; i.e., its lower extremity is closer to the cab of the pickup than its upper extremity. The bottom of cylinder 18 is provided with cylinder mount 48. Cylinder pin 44 is rotationally attached to cylinder mount 48. It also rests within cylinder slot 46.

Figure 7:
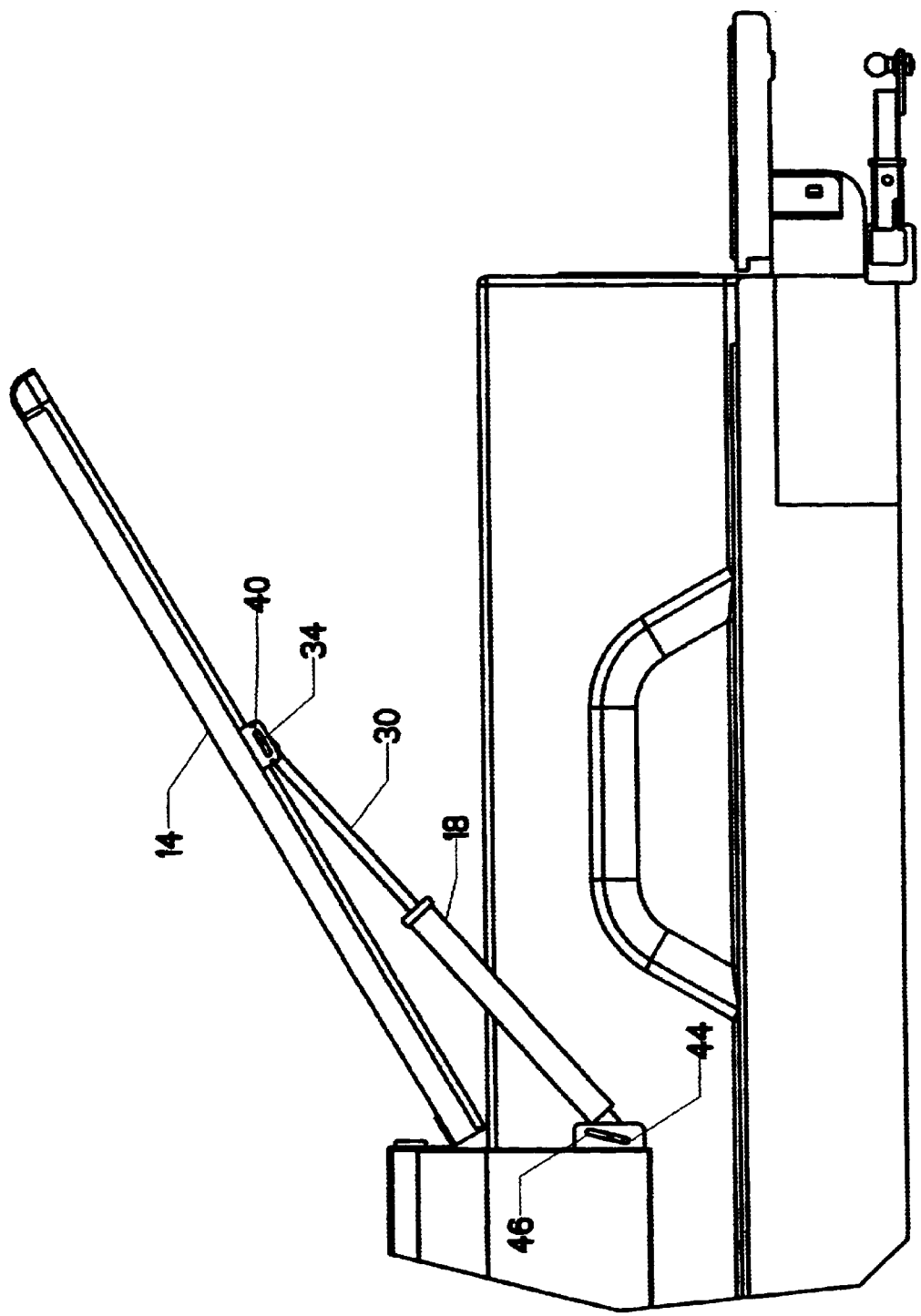
FIG. 7 is an elevation view, showing the cover in its open position.
Figure 8:
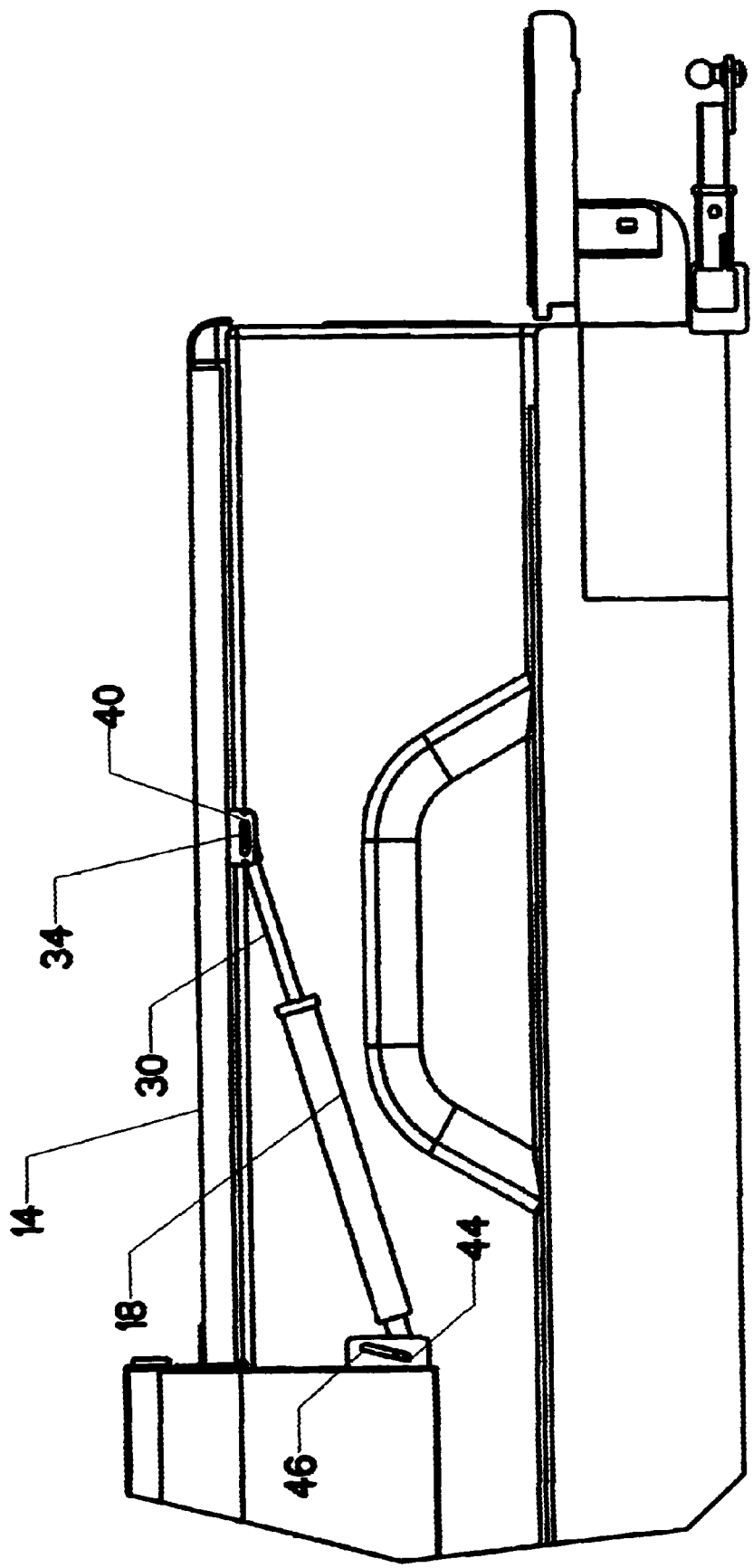
FIG. 8 is an elevation view, showing the cover in the process of closing.
Figure 9:
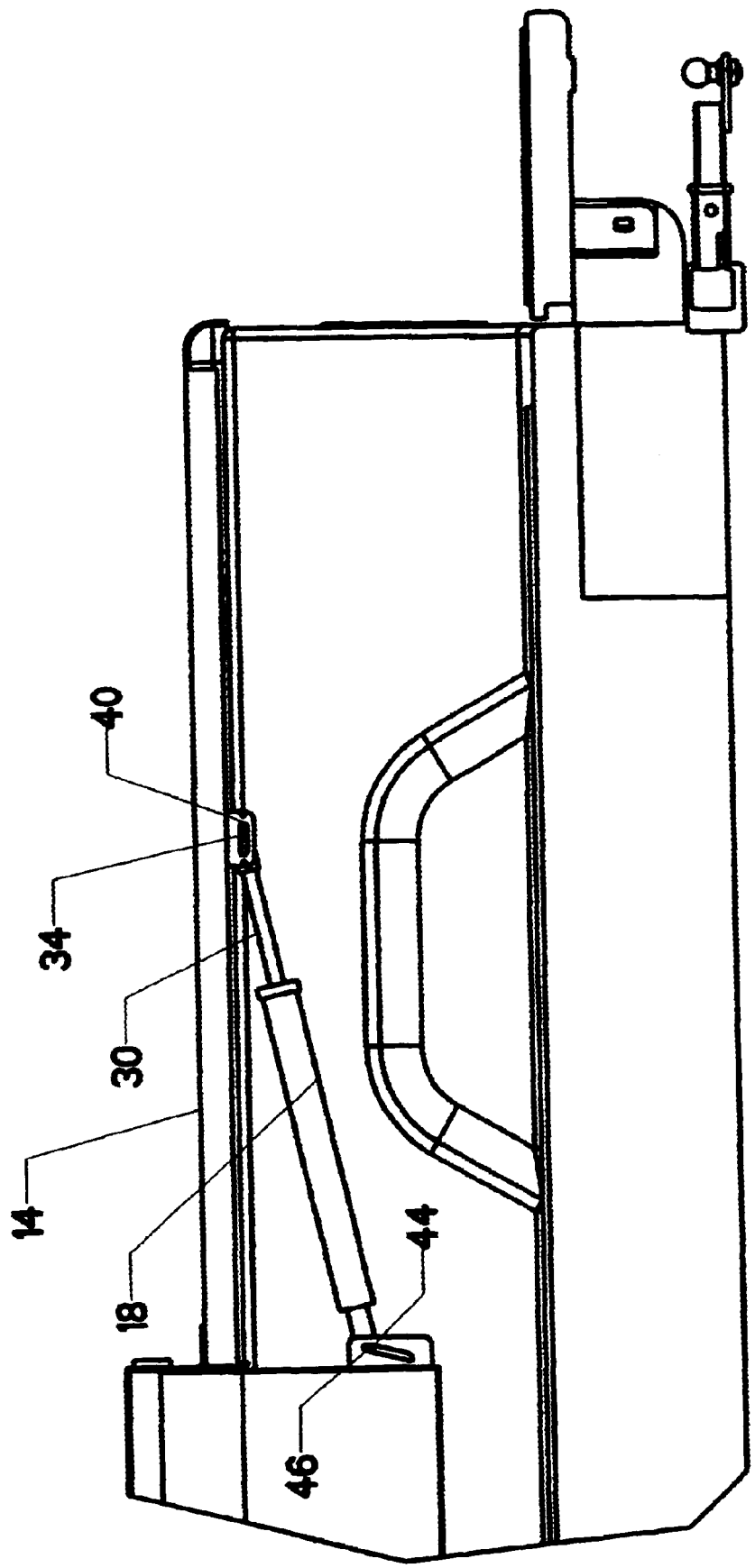
FIG. 9 is an elevation view, showing the cover in its fully closed position.

The motivation underlying the angled nature of cylinder slot 46 is shown in FIGS. 7 through 9. FIG. 7 shows cover 14 in its open position. Hydraulic cylinder 18 is at this point under a compressive load. This fact causes cylinder pin 44 to move to the bottom of cylinder slot 46. FIG. 8 shows the invention at the point where cover 14 has just closed over the bed, but before hydraulic cylinder 18 has applied additional closing force. FIG. 9 shows the invention in the closed and locked state—just after the limit switches or other control device has caused rod 30 to cease retracting. At this point, two actions have occurred. First, as described previously, rod pin 34 has moved forward—toward the pickup truck cab—in rod slot 40. Second, cylinder pin 44 has moved up to the upper extreme of cylinder slot 46. This has resulted in hydraulic cylinder 18 tucking up against the underside of cover 14. This fact means that hydraulic cylinder 18 does not consume valuable bed space when cover 14 is in the closed position.

At this point, the reader may naturally wonder why the fact that the hydraulic cylinder does not consume bed space in the closed position is relevant, since the hydraulic cylinder most certainly does consume that space in the opening and closing operations. The answer lies in the fact that in some embodiments, tailgate 22 can be configured to open and close even though cover 14 is in the closed position. Looking at FIG. 4, those embodiments eliminate the portion of recessed channel 26 that lies over tailgate 22. Thus, tailgate 22 may be opened without disturbing cover 14. It is therefore important—for these embodiments—that a central portion of the bed not be obstructed by hydraulic cylinder 18.

Figure 10:
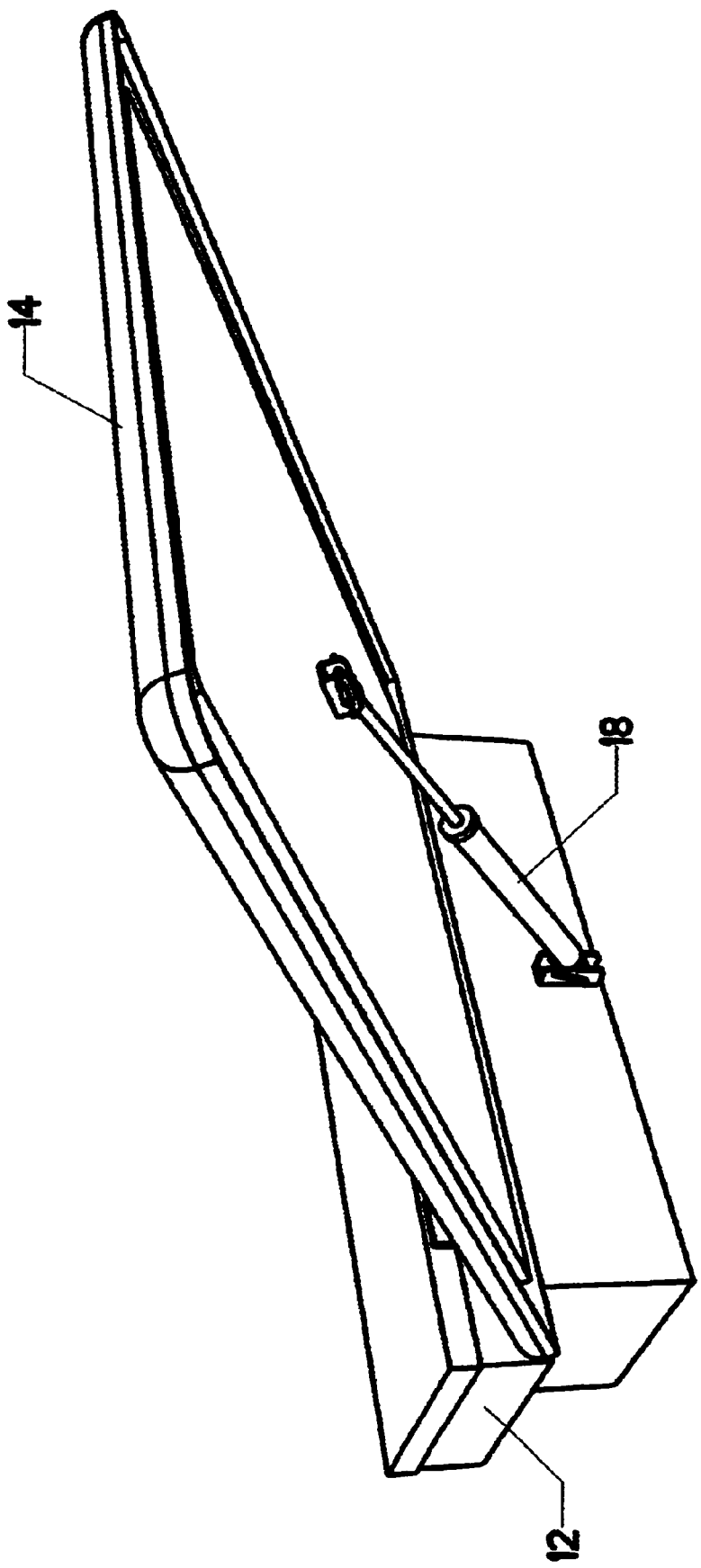
FIG. 10 is a perspective view, showing the toolbox and attached cover as a separate unit.

FIG. 10 shows toolbox 12 and cover 14—along with other associated elements—detached from the pickup truck. The reader will by this point understand that in the embodiment shown in FIG. 10, the hydraulic pump, hydraulic cylinder, and control circuits can all be housed within this one unit. In order to install it on a truck, one needs only to provide electrical power and physically attach the unit.

Figure 11:
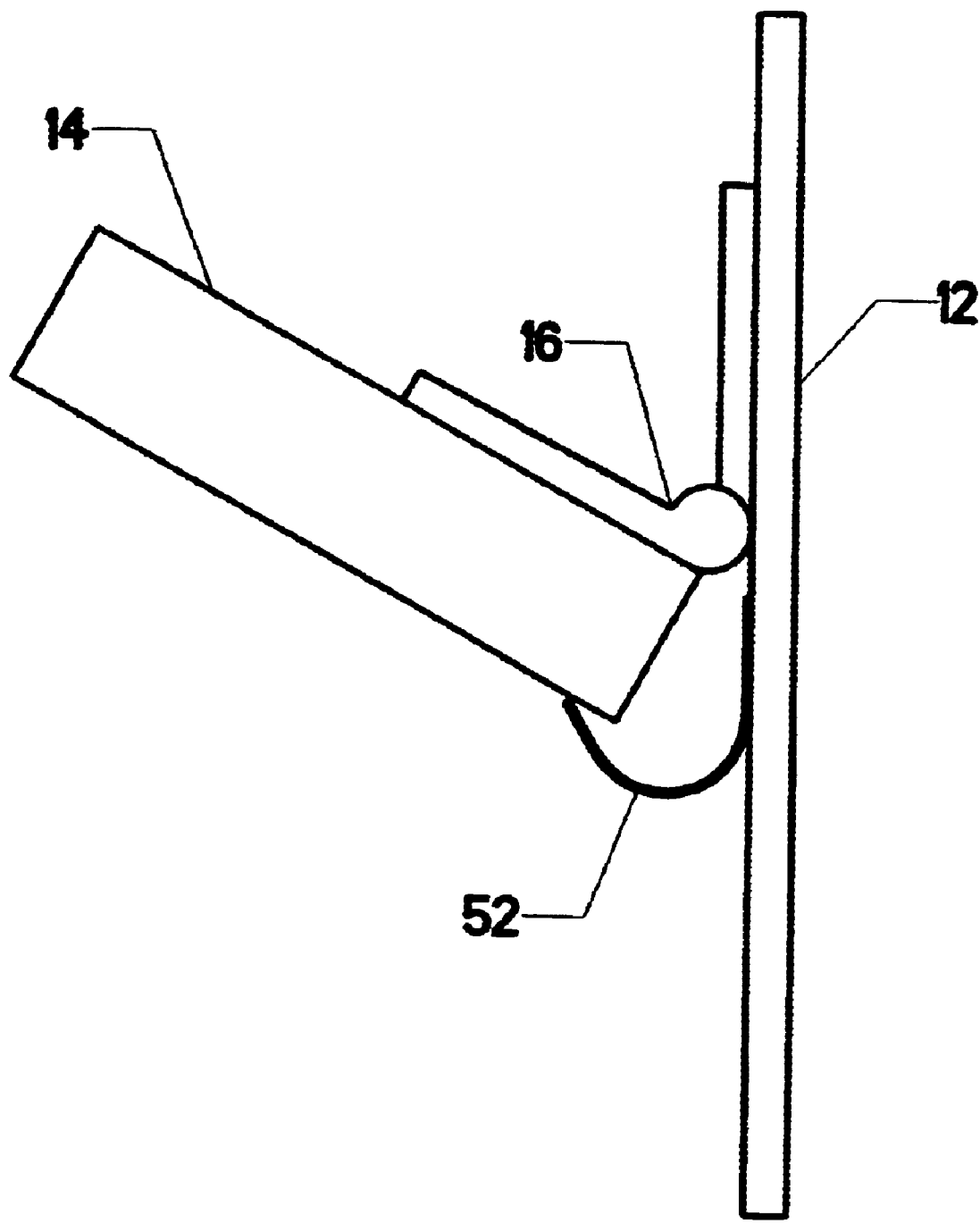
FIG. 11 is an elevation view, showing the attachment of the cover to the toolbox.

It is important to prevent the entry of water into the bed when cover 14 is in the closed position. A water tight seal as to the truck sides and tailgate is provided via the arrangements shown in FIGS. 3 and 4. However, it is also important to seal the interface between toolbox 12 and cover 14. FIG. 11 shows an elevation view of the interface found at hinge 16. Rain gutter 52 is placed beneath hinge 16, so that any water leaking past will be contained within gutter 52. Gutter 52 runs transversely across the toolbox, exiting on either side past the outer extremes of cover 14. Thus, any water leaking past hinge 16 will be trapped by gutter 52 and drained away.

Having read the preceding disclosure, the reader will appreciate that many devices could be substituted for hydraulic cylinder 18. These would include, without limitation: screw drive devices, four bar linkage devices, pneumatic lift systems, gear drives driving a rotary pinion located at hinge 16, etc. Likewise, the reader will appreciate that the invention includes embodiments having no lifting device at all. In its simplest form, the invention would comprise only a cover 14 as attached to a toolbox 12 (the embodiment shown in FIG. 10, with the exclusion of the hydraulic cylinder and mounting hardware).

Likewise, it is certainly not essential that the hydraulic cylinder be mounted to the toolbox. It could just as easily be mounted to the pickup truck itself. This could be true where there is a toolbox, or for instances where no toolbox is used (Although, as explained previously, the novel aspects for those embodiments not incorporating a toolbox are limited to the mounting systems for the lift cyder).

Figure 12:
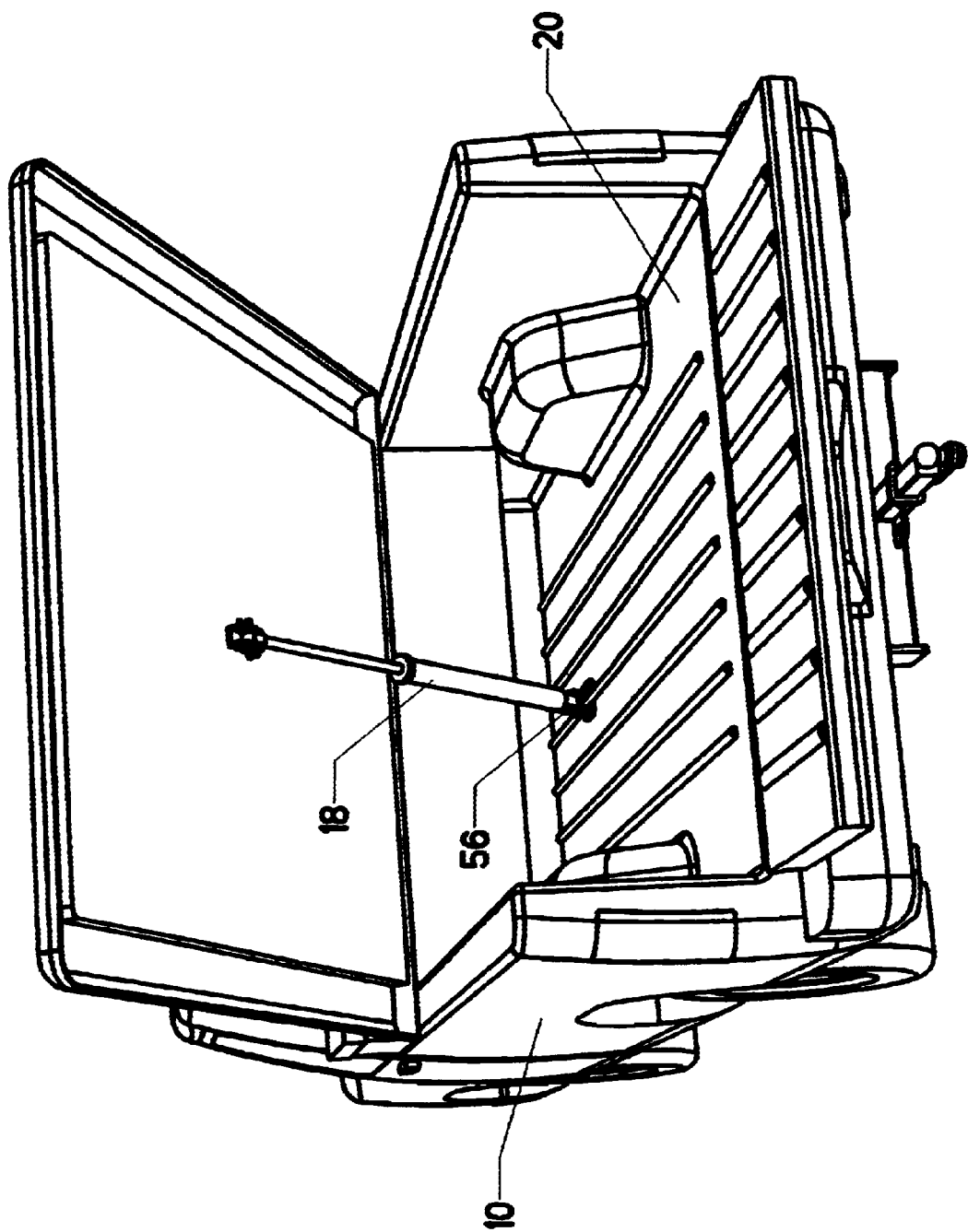
FIG. 12 is a perspective view, showing how the hydraulic cylinder attaches to the truck.

FIG. 12 shows such an embodiment. The reader will observe that hydraulic cylinder 18 is attached to pickup truck 10 via the placement of toolbox bracket 56 directly on the bed of the truck. Toolbox bracket 56 can be attached to the truck via bolts, welding, or other common prior art techniques.

Although the preceding description contains significant detail, it should not be construed as limiting the scope of the invention but rather as providing illustrations of the preferred embodiment of the invention. Thus, the scope of the invention should be fixed by the following claims, rather than by the examples given.

Having described my invention, I claim:

1. A covering device for a pickup truck, wherein said pickup truck includes a bed bounded by a cab, a first truck side, and a second truck side, and wherein said pickup truck includes a toolbox, mounted within said bed proximate said cab, and spanning the distance from said first truck side to said second truck side, said covering device comprising:

a. a cover, rotatably mounted to said toolbox in a position distal from said cab, wherein said cover is capable of moving between an open position providing access to said bed and a closed position covering over said bed, and wherein when said cover is in said closed position, said cover allows access to said toolbox;

b. an extendable lift cylinder, having a first end and a second end, wherein said lift cylinder is capable of exerting substantial mechanical force;

c. wherein said first end of said lift cylinder is attached to said toolbox;

d. wherein said second end of said lift cylinder is attached to said cover, so that when said lift cylinder is extended, said cover is rotated up and away from said bed toward said open position; and e. control means for actuating said lift cylinder.

2. A covering device as recited in claim 1, wherein:

a. said cover is generally rectangular in shape, having a forward portion which is rotatably mounted to said toolbox, a first side portion positioned to close over said first truck side, a second side portion positioned to close over said second truck side, an upper surface, and a lower surface;

b. wherein said attachment between said lift cylinder and said cover comprises:

a cover bracket, fixedly attached to said cover on said lower surface;

ii. sliding means attaching said cover bracket to said second end of said lift cylinder, wherein said sliding means allows said second end of said lift cylinder to move relative to said cover bracket, over a limited range, with said relative motion being generally parallel to the orientation of said first truck side; and iii. spring biasing means configured to resist said motion between said second end of said lift cylinder and said cover bracket.

3. A covering device as recited in claim 1, wherein said attachment between said lift cylinder and said toolbox comprises:

a. a toolbox bracket, fixedly attached to said toolbox;

b. a cylinder slot running transversely through said toolbox bracket in an approximately vertical orientation, having an upper extreme and a lower extreme, wherein said lower extreme is closer to said cab than said upper extreme;

c. a cylinder pin, connected to said lift cylinder and slidably resting within said cylinder slot, so that when said control means causes said lift cylinder to retract and after said cover is closed, said lift cylinder will force said cylinder pin toward said upper extreme in said cylinder slot, thereby tucking said lift cylinder up against said cover.

4. A covering device for a pickup truck, wherein said pickup truck includes a bed bounded by a cab, a first truck side, and a second truck side, and wherein said pickup truck includes a toolbox, mounted within said bed proximate said cab, and spanning the distance from said first truck side to said second truck side, said covering device comprising:

a. a cover, rotatably mounted to said toolbox in a position distal from said cab, wherein said cover is capable of moving between an open position providing access to said bed and a closed position covering over said be, and wherein when said cover is in said closed position, said cover allows access to said toolbox;

b. an extendable lift cylinder, having a first end and a second end, wherein said lift cylinder is capable of exerting substantial mechanical force;

c. wherein said first end of said lift cylinder is attached to said truck;

d. wherein said second end of said lift cylinder is attached to said cover, so that when said lift cylinder is extended, said cover is rotated up and away from said bed toward said open position; and e. control means for actuating said lift cylinder.

5. A covering device as recited in claim 4, wherein:

a. said cover is generally rectangular in shape, having a forward portion which is rotatably mounted to said toolbox, a first side portion positioned to close over said first truck side, a second side portion positioned to close over said second truck side, an upper surface, and a lower surface;

b. wherein said attachment between said lift cylinder and said cover comprises:

i. a cover bracket, fixedly attached to said cover on said lower surface;

ii. sliding means attaching said cover bracket to said second end of said lift cylinder, wherein said sliding means allows said second end of said lift cylinder to move relative to said cover bracket, over a limited range, with said relative motion being generally parallel to the orientation of said first truck side; and iii. spring biasing means configured to resist said motion between said second end of said lift cylinder and said cover bracket.

6. A covering device for a pickup truck, wherein said pickup truck includes a bed bounded by a cab, a first truck side, and a second truck side, comprising:

a. a cover, rotatably mounted to said pickup truck in a position proximate said cab, wherein said cover is capable of moving between an open position providing access to said bed and a closed position covering over said bed;

b. an extendable lift cylinder, having a first end and a second end; wherein said lift cylinder is capable of exerting substantial mechanical force;

wherein said first end of said lift cylinder is attached to said pickup truck;

c. wherein said second end of the said lift cylinder is attached to said cover, so that when said lift cylinder is extended, said cover is rotated up and away from said bed toward said open position;

d. control means for actuating said lift cylinder;

e. wherein said cover is generally rectangular in shape, having a forward portion which is rotatably mounted to said pickup truck, a first side portion positioned to close over said first truck side, a second side portion positioned to close over said second truck side, an upper surface, and a lower surface;

f. wherein said attachment between said lift cylinder and said cover comprises:

i. a cover bracket, fixedly attached to said cover on said lower surface;

ii. sliding means attaching said cover bracket to said second end of the said lift cylinder, wherein said sliding means allows said second end of said lift cylinder to move relative to said cover bracket, over a limited range, with said relative motion being generally parallel to the orientation of said first truck side; and iii. spring biasing means configured to resist said motion between said second end of said lift cylinder and said cover bracket.

* * * * *